United States Patent
Qu et al.

(10) Patent No.: US 8,849,321 B2
(45) Date of Patent: **\*Sep. 30, 2014**

(54) FILTERING OF BROADCAST SMS MESSAGES

(75) Inventors: Hai Qu, San Diego, CA (US); Nobuyuki Uchida, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/631,524

(22) Filed: Dec. 4, 2009

(65) Prior Publication Data

US 2010/0081464 A1    Apr. 1, 2010

Related U.S. Application Data (63) Continuation of application No. 10/206,550, filed on Jul. 25, 2002.

(51) Int. Cl.
| | |
|---|---|
| H04W 4/00 | (2009.01) |
| H04W 4/06 | (2009.01) |
| H04W 8/18 | (2009.01) |
| H04M 1/663 | (2006.01) |
| H04M 1/725 | (2006.01) |
| H04W 4/14 | (2009.01) |

(52) U.S. Cl.
CPC ............. *H04W 4/06* (2013.01); *H04W 8/183* (2013.01); *H04M 1/72547* (2013.01); *H04W 4/14* (2013.01); *H04M 1/663* (2013.01)
USPC .... 455/466; 455/414.1; 455/90.2; 379/88.22; 379/88.23

(58) Field of Classification Search
CPC ..................... H04M 1/72547; H04M 1/72552; H04M 2203/651; H04M 3/53333
USPC ............... 379/142.06, 88.22, 88.23; 455/466, 455/418, 419, 90.2, 414.1, 3.02; 340/7.32; 1/1; 705/64

See application file for complete search history.

(56) References Cited

U.S. PATENT DOCUMENTS 5,797,094 A    8/1998  Houde et al.
6,157,815 A *  12/2000 Collins et al. ............... 340/7.32

(Continued)

FOREIGN PATENT DOCUMENTS

| EP | 0752793 A2 | 1/1997 |
| FR | 2815509 | 4/2002 |

OTHER PUBLICATIONS

ANSI/TIA/EIA-637-B-2002, "Short Message Service for Wideband Spread Spectrum Systems", 3GPP2, C.S0015-A v1.0, Jan. 2002.

(Continued)

*Primary Examiner* — Md S Elahee
(74) *Attorney, Agent, or Firm* — Rupit M. Patel (57) ABSTRACT

Techniques for filtering broadcast SMS messages at a mobile station based on network configuration, user configuration, and/or user preferences. In one method, a broadcast message is initially received, and one or more filtering criteria are applied to the received broadcast message. The filtering criteria are defined by settings stored in a removable module (e.g., the R-UIM) coupled to the receiver. The received broadcast message is then processed if it is not filtered out by the one or more filtering criteria. The one or more filtering criteria may include (1) those imposed by a service provider and defined in a network configuration setting, (2) those determined by the mobile user and defined in a user configuration setting, (3) those selected by the mobile user based on user preferences, which allow for filtering of broadcast messages based on service category, language, and priority, or (4) any combination of the above.

18 Claims, 8 Drawing Sheets

(56) References Cited

U.S. PATENT DOCUMENTS

| | | | |
|---|---|---|---|
| 6,175,743 B1 * | 1/2001 | Alperovich et al. | 455/466 |
| 6,201,974 B1 | 3/2001 | Lietsalmi et al. | |
| 6,324,272 B1 * | 11/2001 | Abu-Shukhaidem et al. | 379/142.06 |
| 6,819,932 B2 | 11/2004 | Allison et al. | |
| 6,999,781 B1 | 2/2006 | Wallenius | |
| 7,653,401 B2 | 1/2010 | Qu et al. | |
| 2002/0063150 A1 | 5/2002 | Nygren et al. | |
| 2002/0138443 A1 * | 9/2002 | Schran et al. | 705/64 |
| 2003/0034888 A1 | 2/2003 | Ernst et al. | |
| 2003/0182403 A1 | 9/2003 | De Bonet | |
| 2004/0002943 A1 * | 1/2004 | Merrill et al. | 707/1 |
| 2004/0106396 A1 | 6/2004 | Segura et al. | |
| 2004/0203941 A1 * | 10/2004 | Kaplan et al. | 455/466 |

OTHER PUBLICATIONS

European Search Report—EP10160889, Search Authority—Munich Patent Office, Aug. 10, 2010.
International Search Report—PCT/US03/022592, International Search Authority—European Patent Office—Feb. 12, 2003.
Taiwanese Search Report—092120225—TIPO—Mar. 18, 2010.
TIA/EIA/IS-820-1 v. 4.0, "Removable User Identity Module" (R-UIM) for cdma2000 Spread Spectrum Systems.3GPP2 C.S0023-0, Version 4.0, Jun. 15, 2001.
TSB-58-E, "Administration of Parameter Value Assignments for cdma2000 Spread Spectrum Systems", 3GPP2 CR. 1001-C, v. 1.0, Jan. 11, 2002.

* cited by examiner

Service Table 300

| Service Category | Language | Priority | Selected | Alert Option | Max Messages | ... |
|---|---|---|---|---|---|---|
| General News - Local | English | 00 | Yes | 0000 | 10 | |
| General News - National | Spanish | 10 | No | 0010 | 5 | |
| Sports News - National | English | 00 | Yes | 0100 | 20 | |
| Area Traffic Reports | English | 01 | No | 0000 | 5 | |
| Local Weather | English | 11 | No | 1010 | 3 | |
| Stock Quotes | English | 00 | Yes | 0000 | 20 | |
| ⋮ | ⋮ | ⋮ | ⋮ | ⋮ | ⋮ | |

*FIG. 3*

$EF_{BCSMScfg}$ 410

| Identifier: " " | Structure: transparent | Optional |
|---|---|---|
| File size: 1 byte | Update Activity: Low | |

Access Conditions:
    READ           CHV1
    UPDATE       ADM
    INVALIDATE  ADM
    REHABILITATE ADM

| Bytes | Description | M/O | Length |
|---|---|---|---|
| 1 | Network Broadcast Configuration | M | 1 byte |

Network Broadcast Configuration
    0 = Disallow
    1 = Allow Table Only
    2 = Allow All
    3-255 = Reserved

*FIG. 4A*

EF$_{BCSMSpref}$ 420

| Identifier: " " | Structure: transparent | | Optional |
|---|---|---|---|
| File size: 1 byte | Update Activity: High | | |
| Access Conditions: <br>     READ            CHV1 <br>     UPDATE       CHV1 <br>     INVALIDATE   ADM <br>     REHABILITATE  ADM ||||
| Bytes | Description | M/O | Length |
| 1 | User Broadcast Configuration | M | 1 byte |

User Broadcast Configuration
  0 = Deactivate
  1 = Activate Table Only
  2 = Activate All
  3-255 = Reserved

FIG. 4B

EF$_{BCSMStable}$ 430

| Identifier: " " | Structure: linear fixed | | Optional |
|---|---|---|---|
| Record length: 9+X bytes | Update Activity: High | | |
| Access Conditions: <br>     READ            CHV1 <br>     UPDATE       CHV1 <br>     INVALIDATE   ADM <br>     REHABILITATE  ADM ||||
| Bytes | Description | M/O | Length |
| 1 | Select | M | 1 byte |
| 2-3 | Service Category | M | 2 byte |
| 4 | Language | M | 1 byte |
| 5 | Priority | M | 1 byte |
| 6 | Alert Option | M | 1 byte |
| 7 | Max Messages | M | 1 byte |
| 8 | Label Encoding | M | 1 byte |
| 9 to 9+X | Label | M | X bytes |

Select
  0 = Selected
  1 = Not selected

Broadcast Address fields (BC_ADDR)

| Priority | Message_ID | Zone_ID | Service | Language |
|---|---|---|---|---|

FILTERING OF BROADCAST SMS MESSAGES

BACKGROUND

1. Field

The present invention relates generally to wireless messaging communication, and more specifically to techniques for filtering SMS broadcast messages at a mobile station.

2. Background

Short Message Service (SMS) is a service that supports the exchange of SMS or short messages between mobile stations and a wireless communication system. These short messages may be user-specific messages intended for specific recipient mobile stations or broadcast messages intended for multiple mobile stations.

Broadcast SMS messages may be sent by a wireless communication network for various service categories (e.g., news, sports, and so on), in different languages, and with different priorities. Each mobile station in the network may be allowed by its service provider to receive all broadcast messages, only a subset of the broadcast messages, or no broadcast messages. For a given mobile station, the broadcast messages that it is allowed to receive may be determined by various factors which may relate to network deployment, service provisioning, subscription status, and so on. For example, a premium mobile subscriber may be allowed to receive all broadcast messages whereas a regular mobile subscriber may be allowed to receive only broadcast messages for certain bundled service categories.

A mobile user may be interested in receiving only some of the broadcast SMS messages that are allowed to be received by the mobile station. For example, the mobile user may be interested in receiving only broadcast messages for certain service categories (e.g., sports) and/or with certain priority level or higher. The broadcast messages that can be received by the mobile station may also be limited by the availability of resources (e.g., memory storage) at the mobile station.

There is therefore a need in the art for techniques to "filter" SMS broadcast messages to be received by a mobile station based on one or more criteria determined by the service provider and/or the mobile user.

SUMMARY

Techniques are provided herein to filter broadcast SMS messages at a mobile station based on network configuration, user configuration, user preferences, and so on. These techniques enable the service provider to configure the mobile station's broadcast SMS capabilities and further allow the mobile user to configure and change the broadcast SMS capabilities based on user preferences. The settings for the network configuration, user configuration, and user preferences are stored in a non-volatile memory that is within the mobile station or accessible to the mobile station (e.g., a removable user identity module (R-UIM)).

In one embodiment, a method is provided for filtering broadcast messages at a receiver (e.g., a mobile station) in a wireless communication network (e.g., a CDMA network that implements ANSI-41). In accordance with the method, a broadcast message is initially received, and one or more filtering criteria are applied to the received broadcast message. The filtering criteria are defined by settings stored in a removable module (e.g., the R-UIM) coupled to the receiver. The received broadcast message is then processed if it is not filtered out by the one or more filtering criteria.

The one or more filtering criteria may include (1) those imposed by a service provider and defined by a network configuration setting, (2) those determined by the mobile user and defined by a user configuration setting, (3) those selected by the mobile user based on user preferences, or (4) any combination thereof. The network configuration setting may indicate that all broadcast messages are allowed to be received ("Allow All"), no broadcast messages are allowed to be received ("Disallow"), or only broadcast messages for entries programmed in a service table are allowed to be received ("Allow Table Only"). The user configuration setting may indicate that all allowed broadcast messages are to be received ("Activate All"), no broadcast messages are to be received ("Deactivate"), or only broadcast messages for entries programmed in a service table are to be received ("Activate Table Only").

The user-selected filtering criteria allow for filtering of broadcast messages based on service category, language, priority, or any combination thereof. These criteria apply to entries programmed in the service table, with each entry corresponding to a unique combination of service category and language. Each programmed entry may be selected or unselected, and only broadcast messages for selected entries may be processed (assuming that other criteria are met) if the service table is enabled for use. The network and user configuration settings and the service table may be stored in one or more elementary files in the removable module.

Techniques are also provided herein for over-the-air programming of the network configuration setting and the service table for the mobile station via programming messages.

Various aspects and embodiments of the invention are described in further detail below. The invention further provides methods, program codes, digital signal processors, mobile stations, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
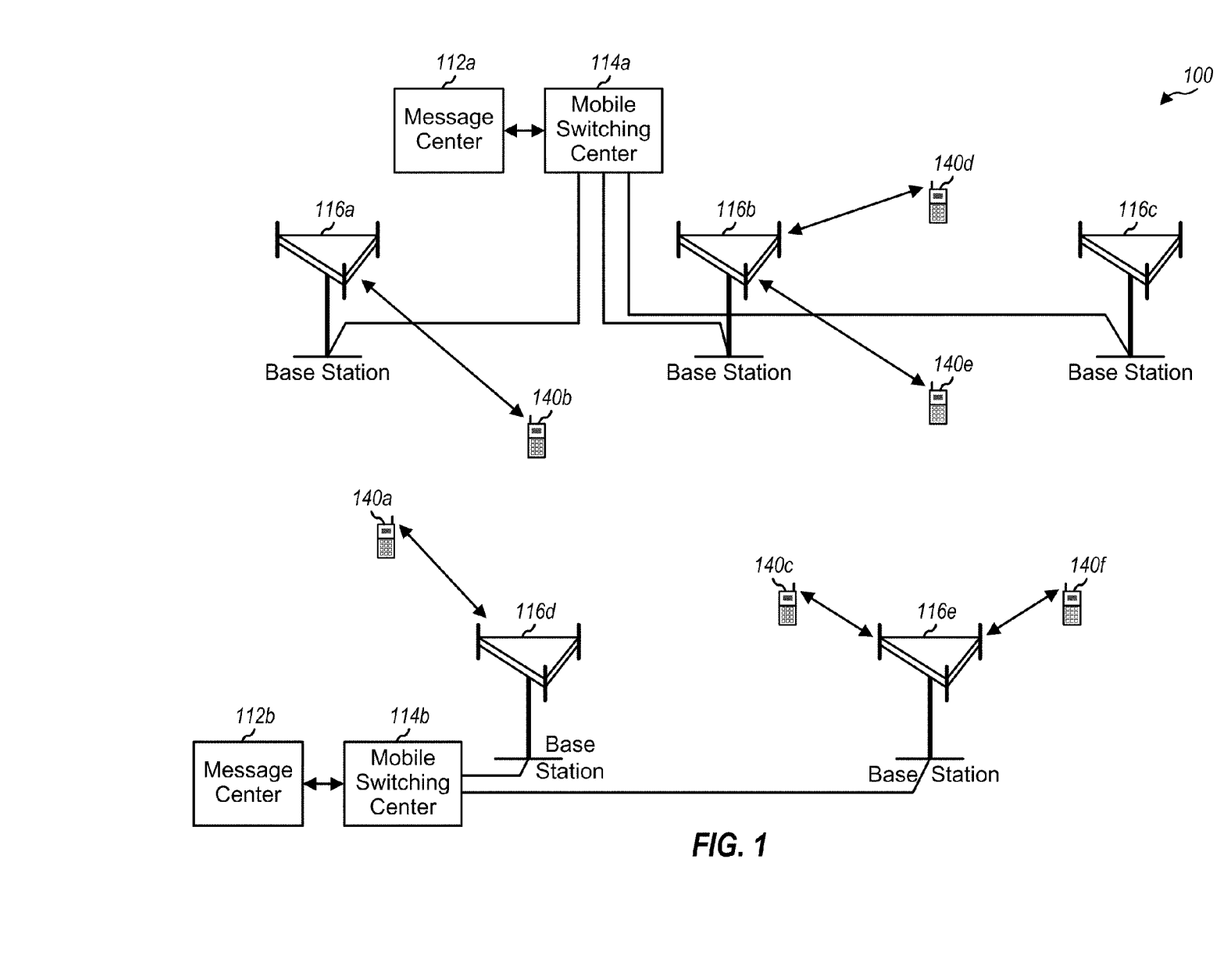
FIG. 1 is a diagram of a wireless communication network that supports SMS.

FIG. 1 is a diagram of a wireless communication network 100 that supports Short Message Service (SMS). Network 100 includes a number of message centers (MCs) 112, mobile switching centers (MSCs) 114, and base stations 116. The message centers are responsible for storing, relaying, and forwarding short messages for mobile stations 140 within the network. The MSCs perform switching functions (i.e., routing of messages and data) for the mobile stations within their coverage area. The message centers may be implemented separate from or integrated with the MSCs. Each mobile station is served by one MSC at any given moment, and this MSC is referred to as the mobile station's serving MSC. The base stations are fixed stations used for communicating with the mobile stations. A mobile station is also referred to as a remote station, a terminal, user equipment (UE), or some other terminology.

In the embodiment shown in FIG. 1, each message center communicates with a corresponding MSC to support SMS. Each MSC further couples to a number of base stations and controls the communication for the mobile stations under the coverage of these base stations. Each base station communicates with the mobile stations under its coverage area to support SMS and other services (e.g., voice, packet data, and so on). Each mobile station may communicate with one or more base stations at any given moment, depending on whether or not it is active and whether or not soft handoff is supported.

Network 100 may be a code division multiple access (CDMA) network, a time division multiple access (TDMA) network, or some other type of network. A CDMA network may be designed to implement one or more standards such as cdma2000, W-CDMA, IS-95, and so on. A TDMA network may also be designed to implement one or more standards such as Global System for Mobile Communications (GSM).

A network typically further implements a particular mobile networking protocol that allows for roaming and advanced services, with ANSI-41 being commonly used for CDMA networks (except for W-CDMA) and GSM Mobile Application Part (GSM-MAP) being used for GSM networks. A network may also employ a combination of different technologies. For example, a GSM1x network is a GSM-MAP network that utilizes a CDMA air interface.

Since SMS is network technology dependent (ANSI-41 or MAP), CDMA and GSM networks that implement different network technologies support different implementations of SMS. Each SMS implementation has different capabilities and utilizes different message types and formats for sending short messages. For a GSM1x network, GSM SMS messages are sent via the CDMA air interface in the form of CDMA SMS messages.

The techniques described herein for filtering broadcast SMS messages may be used in various networks. For clarity, various aspects and embodiments are specifically described for an ANSI-41 based network. The SMS implementation for ANSI-41 based networks is described in detail in TIA/EIA-637-B, entitled "Short Message Service for Wideband Spread Spectrum Systems," which is publicly available and incorporated herein by reference.

Figure 2:
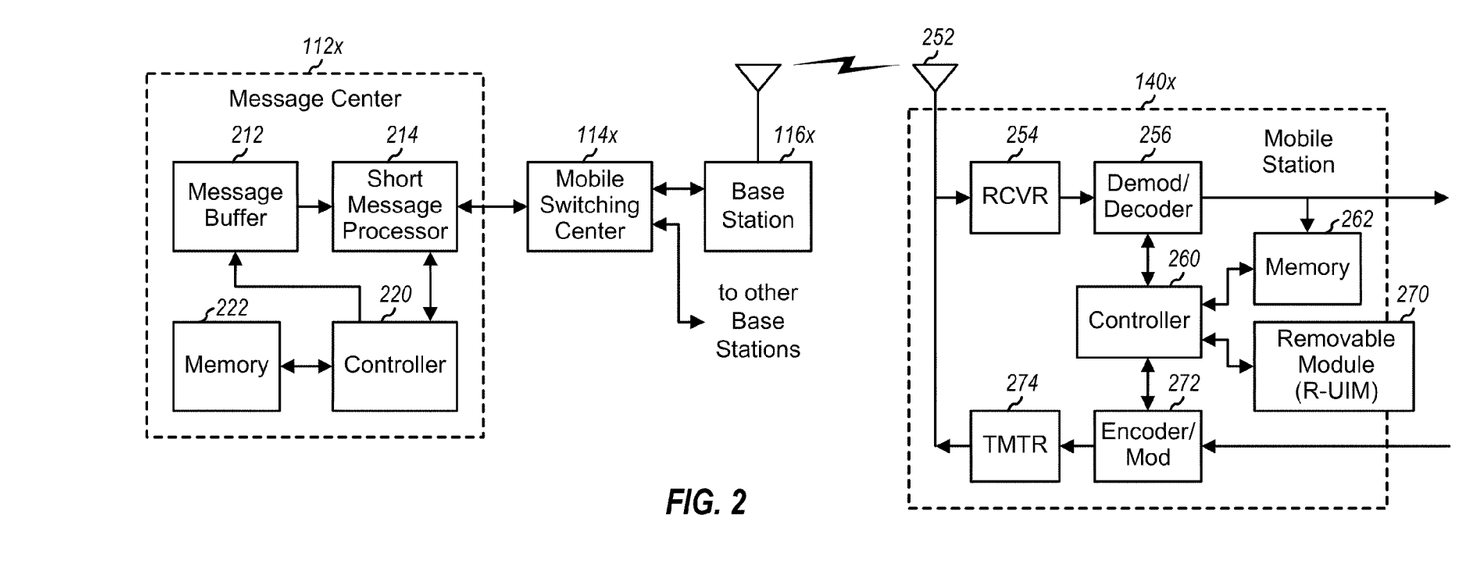
FIG. 2 is a simple block diagram of a message center and a mobile station.

FIG. 2 is a block diagram of an embodiment of a message center 112x and a mobile station 140x. Within message center 112x, data for SMS messages to be sent to the mobile stations is initially stored in a message buffer 212. The data is thereafter retrieved from the buffer as needed and provided to a short message processor 214, which forms SMS messages of the proper type and in the proper format. The SMS messages are then provided to the associated MSC 114x, which further forwards these messages to the proper base stations 116 within its control. Each base station processes the SMS messages to be sent to the mobile stations within its coverage area and includes the processed messages in a modulated signal that is transmitted to the mobile stations.

Within message center 112x, a controller 220 directs the flow of data through the message center and further controls the processing to generate short messages. A memory unit 222 provides storage for program codes and data used by controller 220.

FIG. 2 also shows an embodiment of mobile station 140x. On the receive path, the modulated signal transmitted from the mobile station's serving base station is received by an antenna 252 and provided to a receiver unit (RCVR) 254. Receiver unit 254 conditions (e.g., filters, amplifies, and downconverts) the received signal and further digitizes the conditioned signal to provide samples. A demodulator (Demod)/decoder 256 then demodulates the samples (e.g., based on cdma2000 physical layer processing) and further decodes the demodulated data to provide decoded data, which includes the SMS messages sent in the modulated signal. The data for the user-specific and broadcast SMS messages for this mobile station is provided as output data and may further be stored in a memory 262.

On the transmit path, data and messages to be sent by the mobile station are provided to an encoder/modulator (Mod) 272, which encodes and modulates the data/messages. The modulated data is then conditioned by a transmitter unit (TMTR) 274 to provide a modulated signal suitable for transmission back to the base station.

The mobile station may be designed with a removable user identity module (R-UIM) 270. This R-UIM has a non-volatile memory and can store a subscriber's identity, which may include personal information such as network settings, privileges, preferences, phone books, and so on. For example, the R-UIM may be used to store information used to filter broadcast SMS messages, as described below. The R-UIM makes it easier to roam to countries using different frequencies, or across CDMA or GSM networks, by allowing subscribers to exchange handsets while using the same removable module to maintain their personal information.

A controller 260 directs the operation of the units within mobile station 140x. For example, controller 260 may direct the filtering and processing of incoming broadcast SMS messages and the transmission of acknowledgment, data, and so on. A memory unit 262 provides storage for program codes and data used by controller 260 (e.g., data for SMS messages).

FIG. 2 shows a specific embodiment of message center 112x and mobile station 140x. Other embodiments may also be contemplated and are within the scope of the invention.

Figure 3:
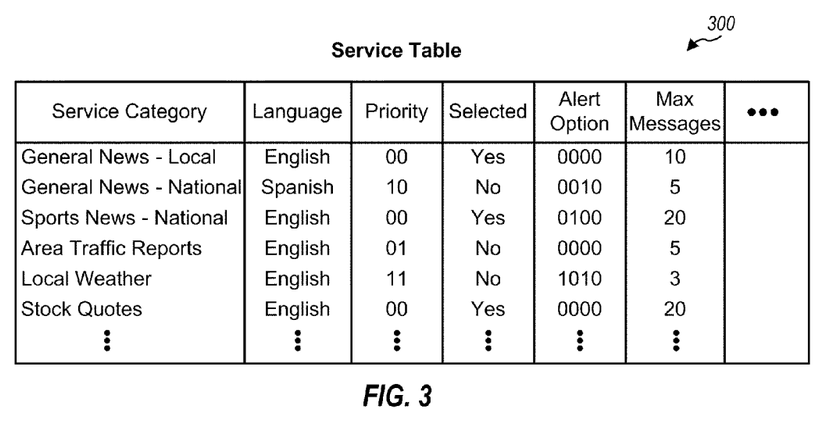
FIG. 3 is a diagram of a service table.

FIG. 3 is a diagram of an embodiment of a service table 300 that may be maintained by a mobile station for filtering broadcast SMS messages. In this specific embodiment, the service table includes four columns used for broadcast message filtering: Service Category, Language, Priority, and Selected. The Service Category column includes the identities of various service categories that have been programmed into the service table. The Language column includes the language associated with each programmed service category. In an embodiment, the service table includes one entry (or row) for each unique combination of service category and language. The lists of all service categories and languages currently defined by TIA/EIA-637-B are given in TSB-58-E, entitled "Administration of Parameter Value Assignments for cdma2000 Spread Spectrum Standards," which is publicly available and incorporated herein by reference. In an alternative embodiment, the service table may be defined to include one entry for each unique combination of values in some other set of specified columns (e.g., one entry for each unique combination of service category/priority, or service category/language/priority, or some other set of columns).

The Priority column includes the priority selected by the mobile user for each service category/language combination (i.e., each programmed entry) in the service table. The Selected column includes an indication of whether or not each service category/language combination in the service table has been selected for reception by the mobile user. Only broadcast messages for programmed entries that have been selected are processed by the mobile station (assuming that other criteria, if any, are also satisfied).

The service table may be defined to include other columns for other information useful for broadcast messages. In the embodiment shown in FIG. 3, the service table further includes (1) an Alert Option column to indicate the particular alert option to use for the broadcast messages for each programmed entry, and (2) a Max Message column to indicate the maximum number of broadcast messages that may be stored for each programmed entry. The list of all currently defined alert options is given in the TIA/EIA-637-B standard document.

The service table may also be defined to include other columns for other information that may be pertinent for the processing of broadcast messages.

The filtering of broadcast SMS messages at the mobile station may be performed based on various criteria. In an embodiment, the broadcast message filtering criteria are classified into three categories: network configuration, user configuration, and user preferences.

Network configuration includes filtering criteria imposed by a service provider. In a specific embodiment, a number of possible settings are defined for network configuration and are shown in Table 1. The incoming broadcast messages would then be filtered at the mobile station based on the programmed network configuration setting.

TABLE 1

| Field Name | Description |
|---|---|
| Disallow | This setting disables the mobile station's broadcast SMS capability (i.e., the mobile station will not process broadcast SMS). |
| Allow Table Only | This setting allows the mobile station to receive only broadcast messages for the service categories that have been programmed in the service table. |
| Allow All | This setting allows the mobile station to receive broadcast messages for all service categories. |

User configuration includes filtering criteria determined by the mobile user. In a specific embodiment, a number of possible settings are defined for user configuration and are shown in Table 2. The incoming broadcast messages would further be filtered at the mobile station based on the selected user configuration setting.

TABLE 2

| Field Name | Description |
|---|---|
| Deactivate | This setting deactivates the mobile station's broadcast SMS functions (i.e., the mobile station will not process broadcast SMS). |
| Activate Table Only | This setting allows the mobile station to receive only broadcast messages for the service categories that have been programmed in the service table, subject to any additional filtering criteria included in the service table based on user preferences. This setting is only valid if the network configuration is not Disallow. Moreover, the mobile user can selectively enable and disable individual programmed entries in the service table. |

TABLE 2-continued

| Field Name | Description |
|---|---|
| Activate All | This setting allows the mobile station to receive broadcast messages for all service categories. This setting is only valid if the network configuration is "Allow All". The service table will not be consulted for this setting. |

In an embodiment and as indicated in Table 2, the user configuration is restricted (or constrained) by the network configuration. Thus, the user cannot validly obtain a user configuration setting that is broader than the network configuration setting. For example, if the network configuration setting is "Allow Table Only", then the user configuration setting is restricted to "Activate Table Only" or "Deactivate".

User preferences include filtering criteria selected by the mobile user and are applied to the programmed entries in the service table. The mobile user may be allowed to individually enable/disable (or select/unselect) each programmed entry in the service table. The mobile user may also specify the priority level for each programmed entry. In this case, of all incoming broadcast messages for a particular selected (enabled) programmed entry, only those having priority equal to or greater than the priority level specified in the service table are processed. In an embodiment, the user preferences in the service table only take affect if the service table is enabled for use. This would be the case if the network configuration setting is either "Allow All" or "Allow Table Only" and the user configuration setting is "Activate Table Only".

The network configuration setting thus defines the filtering criteria imposed by the service provider, the user configuration setting defines the filtering criteria determined by the mobile user, and the service table includes the filtering criteria selected by the user. Fewer, different, and/or additional filtering criteria and categories may also be used, and this is within the scope of the invention. Moreover, settings different from those described above may be defined, and this is also within the scope of the invention.

In general, the settings for the network configuration, user configuration, and user preferences (and any other information that may be useful for filtering broadcast SMS messages) may be stored in a non-volatile memory that is either within the mobile station or accessible to the mobile station. The non-volatile memory may be a Flash, an electrically erasable programmable read only memory (EEPROM), a multimedia card (MMC), or some other non-volatile memory type.

Referring back to FIG. 2, these settings may be stored in memory 262 and/or R-UIM 270. If the settings are stored in the R-UIM, then the mobile user will be able to remove the module from one mobile station and insert it into another mobile station, and the new mobile station will preserve the same broadcast SMS configuration and preferences.

The R-UIM includes a number of elementary files (EFs) that are used to store various types of information related to SMS. For example, an $EF_{SMSS}$ (SMS status) stores status information for SMS. The R-UIM and the elementary files for SMS are described in detail in TIA/EIA/IS-820-1, entitled "Removable User Identity Module (R-UIM) for TIA/EIA Spread Spectrum Standards," and 3GPP2 C.S0023-0, entitled "Removable User Identity Module (R-UIM) for cdma2000 Spread Spectrum Systems," both of which are publicly available and incorporated herein by reference.

In an embodiment, the service table and the settings for the network configuration, user configuration, and user preferences are stored in elementary files in the R-UIM.

Figure 4A:
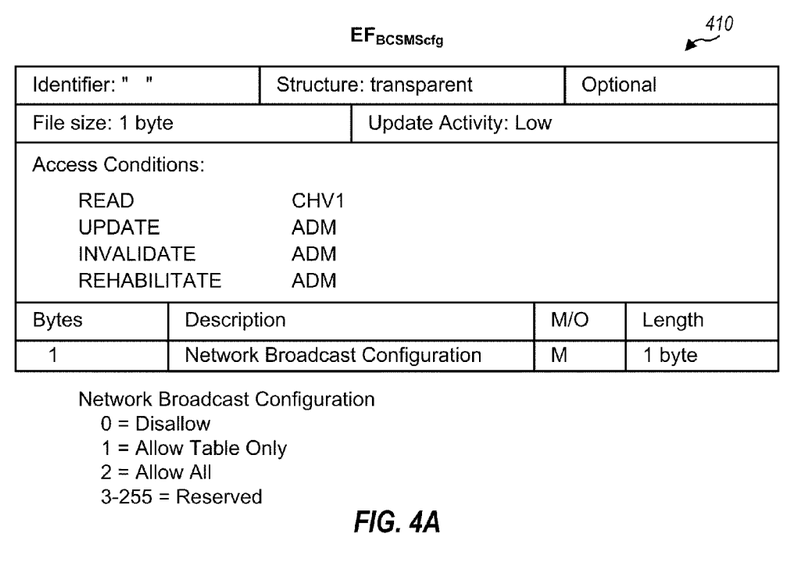
FIGS. 4A through 4C show three elementary files (EFs) that may be used to store the network configuration setting, user configuration setting, and service table, respectively.

FIG. 4A shows an elementary file $EF_{BCSMScfg}$ 410 that may be used to store the network configuration setting. Elementary file 410 includes a number of fields that are defined by TIA/EIA/IS-820-1 and 3GPP2 C.S0023-0. Table 3 lists the fields for the header portion of the elementary file and their short descriptions.

TABLE 3

| Field Name | Description |
| --- | --- |
| Identifier | Includes a value assigned to and used to specifically identify this elementary file. |
| Structure | Indicates the structure of the data in the elementary file. "Transparent" denotes that the data is stored in bit-mapped form. "Linear fixed" indicates that the data is stored in a table format. |
| File-size and Record-length | File size indicates the length (in bytes) of a "transparent" elementary file and Record-length indicates the length of each record in a "linear fixed" (table) elementary file. |
| Update Activity | Indicates the frequency at which the data in the elementary file is expected to be updated. |
| Access Conditions | Specify the conditions under which various types of privilege (Read, Update, Invalidate, and Rehabilitate) are allowed. "CHV1" denotes that cardholder verification (e.g., a personal identification number (PIN)) is required to gain the privilege. "ADM" denotes that the privilege is only allowed for an administrator at a service provider customer center (e.g., a mobile phone store). |

As shown in FIG. 4A, the elementary file $EF_{BCSMScfg}$ includes one byte for the network configuration setting, which is labeled as "Network Broadcast Configuration". This byte may be set as shown in FIG. 4A for the three possible network configuration settings ("Disallow", "Allow Table Only", and "Allow All") described above in Table 1.

Figure 4B:
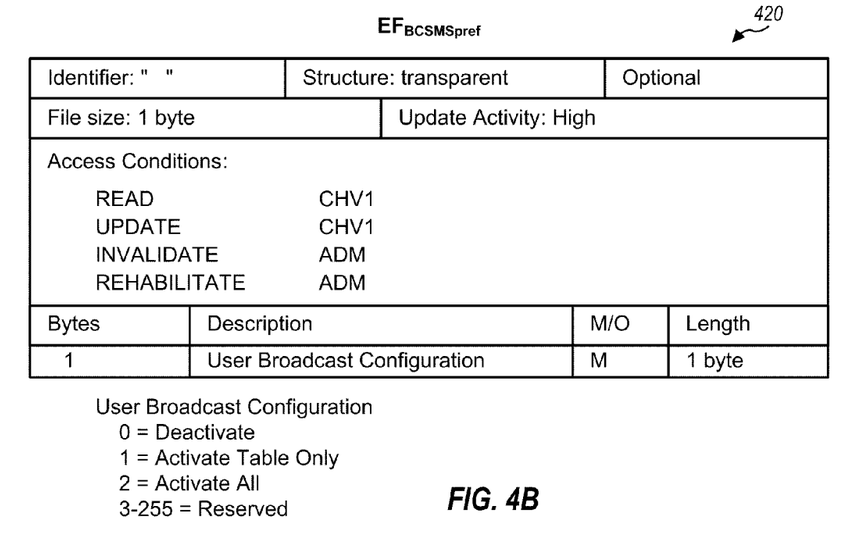

FIG. 4B shows an elementary file $EF_{BCSMSpref}$ 420 that may be used to store the user configuration setting. This elementary file includes one byte for the user configuration setting, which is labeled as "User Broadcast Configuration". This byte may be set as shown in FIG. 4B for the three possible user configuration settings ("Deactivate", "Activate Table Only", and "Activate All") described above in Table 2.

Figure 4C:
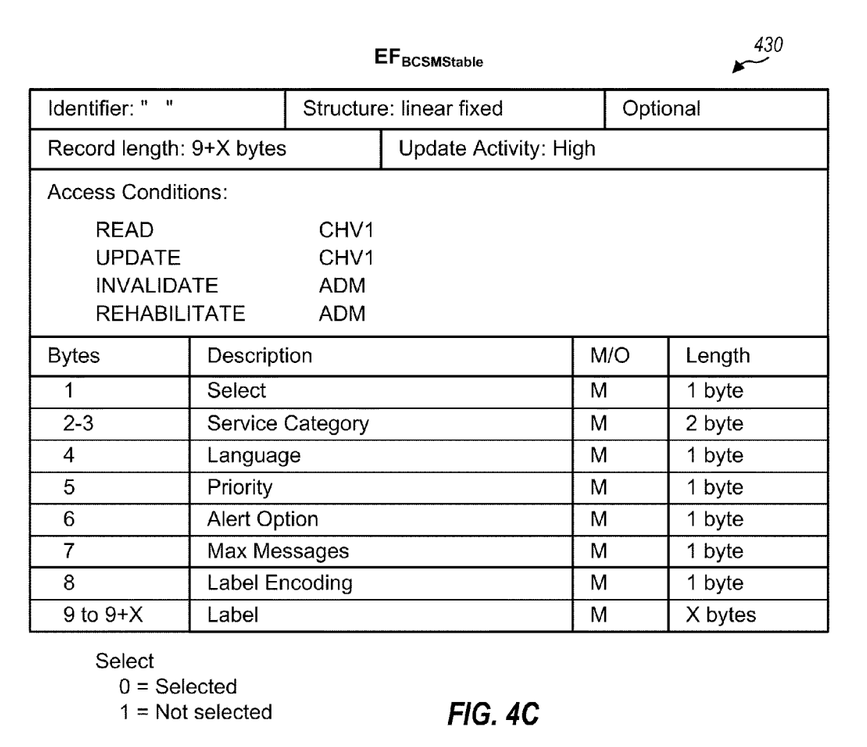

FIG. 4C shows an elementary file $EF_{BCSMStable}$ 430 that may be used to store the information for the service table and the filtering criteria related to user preferences. This elementary file has a linear fixed structure, which is a table. This table has a number of columns, with each column having a particular length (in byte) as specified in the elementary file.

In the specific embodiment shown in FIG. 4C, the elementary file $EF_{BCSMStable}$ defines a service table having eight columns, or eight fields for each entry in the service table. The elementary file includes one instance of these eight fields for each service category/language combination that have been programmed into the service table. Table 4 lists the eight fields for each programmed entry.

TABLE 4

| Field Name | Description |
| --- | --- |
| Select | Indicates whether or not the programmed entry has been selected by the user. |
| Service Category | Includes a value that identifies the service category for the programmed entry. |
| Language | Indicates the language associated with the service category for the programmed entry. |
| Priority | Indicates the priority assigned to the programmed entry by the mobile user. |
| Alert Option | Indicates the option to use to alert the mobile user of a new broadcast message for the programmed entry. |

TABLE 4-continued

| Field Name | Description |
| --- | --- |
| Max Messages | Indicates the maximum number of broadcast messages that may be stored for the programmed entry. |
| Label Encoding | Indicates the coding scheme used for the service category label. |
| Label | Stores the service category label. |

All of the fields defined above for the service table, except for the Select field, are described in detail in the TIA/EIA-637-B standard document.

FIGS. 4A through 4C show a specific embodiment of the elementary files used to store the settings for the network configuration, user configuration, and user preferences. Fewer, different, and/or additional elementary files may also be used. Moreover, fewer, different, and/or additional fields may also be defined for each of the elementary files described above. These various variations are within the scope of the invention.

The service table and the settings for the network configuration, user configuration, and user preferences may be programmed into a non-volatile memory within or accessible to the mobile station by various means. In one embodiment, the network configuration setting and/or the service table are programmed in a controlled environment, such as by an administrator at a service provider customer center. In another embodiment, the network configuration setting and/or the service table are programmed over-the-air using SMS messages, as described below. The user configuration setting and user preferences may be programmed by the mobile user, for example, using a keypad on the mobile station.

Figure 5:
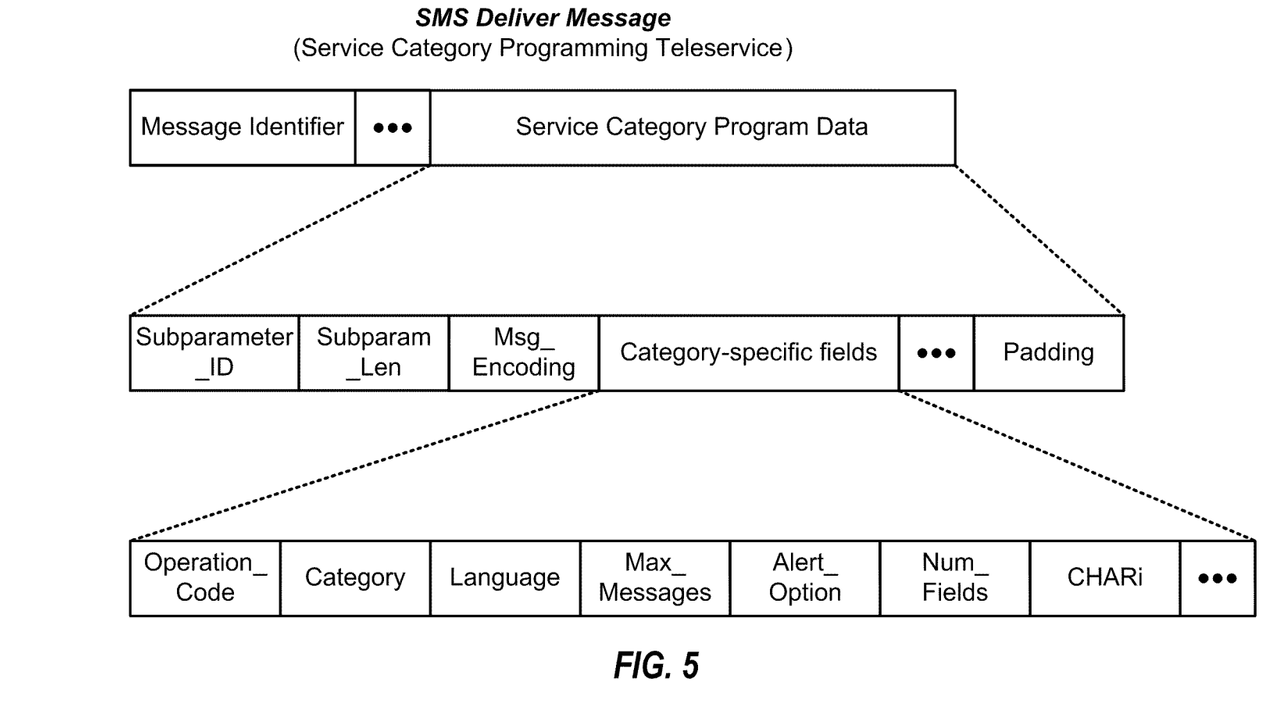
FIG. 5 shows an SMS Deliver Message used to program the service table.

FIG. 5 shows an SMS Deliver Message that may be used by a Service Category Programming Teleservice (SCPT) to add or remove broadcast service categories in the mobile station's service table. The SMS Deliver Message is one of the messages defined for the SMS Teleservice Layer, which is one of the layers for the SMS protocol stack. For SCPT, this message includes a Message Identifier subparameter used to identify the message, a Service Category Program Data subparameter used to carry programming information, and possibly other subparameters.

The Service Category Program Data subparameter further includes a number of fields. One set of Category-specific fields is included in this subparameter for each service category to be programmed by the SMS Deliver Message. The Category-specific fields include the Service Category, Language, Max Messages, Alert Option, and CHARi fields. These fields are used to carry information for the service category to be added to or deleted from the service table. The CHARi fields may be used to carry the service category label. The information from these fields may be mapped directly to the mobile station's service table, such as the one defined above in FIG. 3 and Table 4. The Msg_Encoding subparameter may be mapped to the Label Encoding column in the service table.

Figure 6A:
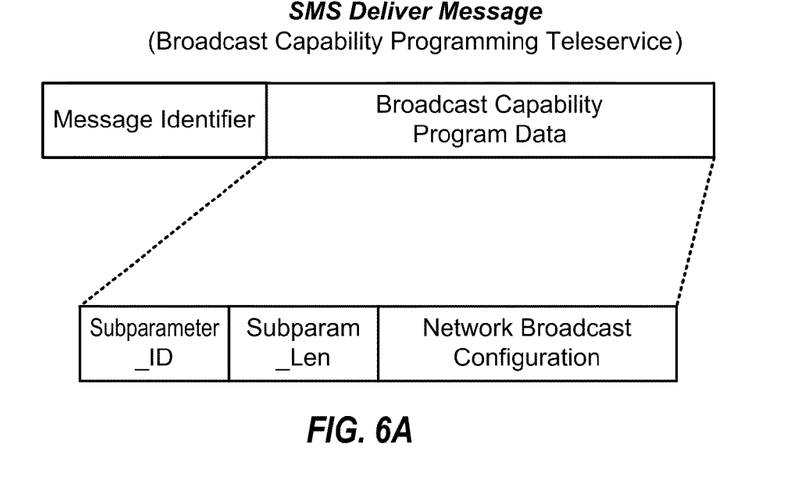
FIGS. 6A and 6B respectively show an SMS Deliver Message and an SMS Submit Message that may be used to program the network configuration setting.

FIG. 6A shows an SMS Deliver Message that may be used by a Broadcast Capability Programming Teleservice (BCPT) to send the network configuration setting. The BCPT is a new teleservice not defined in TIA/EIA-637-B. The SMS Deliver Message includes a Message Identifier subparameter used to identify the message and a Broadcast Capability Program Data subparameter used to carry the network configuration setting.

TIA/EIA-637-B defines 21 subparameters that may be included in SMS Teleservice Layer messages and which are assigned Subparameter ID values of "00000000" through "00010100". A new subparameter may be defined for the Broadcast Capability Program Data subparameter and may be assigned one of the reserved Subparameter ID values (e.g., "00010101"), as shown in Table 5.

TABLE 5

| Subparameter | Subparameter_ID value |
|---|---|
| . | . |
| . | . |
| . | . |
| Broadcast Capability Program Data (new) | "00010101" |
| Broadcast Capability Program Result (new) | "00010110" |
| all other values are reserved | |

The Broadcast Capability Program Data subparameter includes a number of fields, one of which is a Network Broadcast Configuration field. This field may be used to carry the network configuration setting and may be set to one of the three values shown in FIG. 4A.

Figure 6B:
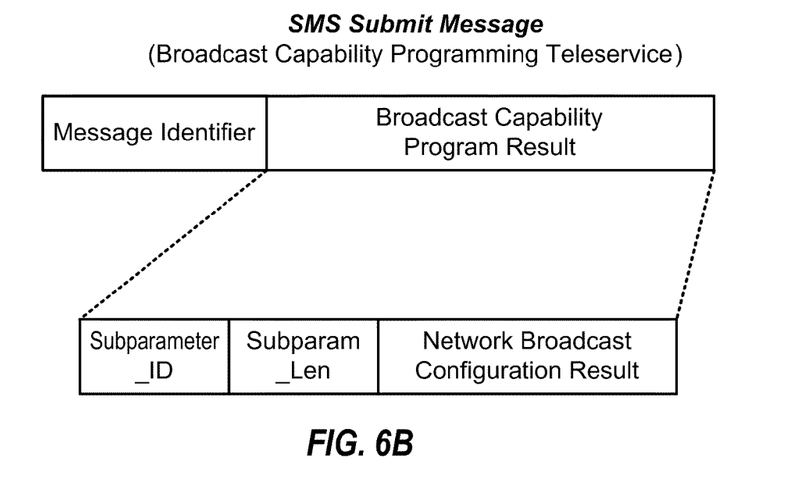

FIG. 6B shows an SMS Submit Message that may be sent by the mobile station in response to the BCPT SMS Deliver Message. This message includes a Message Identifier subparameter and a Broadcast Capability Program Result subparameter used to send the result of the programming of the network configuration setting. A new subparameter may be defined for the Broadcast Capability Program Result subparameter and may be assigned one of the reserved Subparameter ID values (e.g., "00010110"), as shown in Table 5.

The Broadcast Capability Program Result subparameter includes a number of fields, one of which is a Network Broadcast Configuration Result field. This field may be used to carry (1) an indication of whether or not the network configuration setting has been successfully programmed at the mobile station, (2) an error code, if programming was not successful, and (3) possibly other pertinent information.

Figure 7:
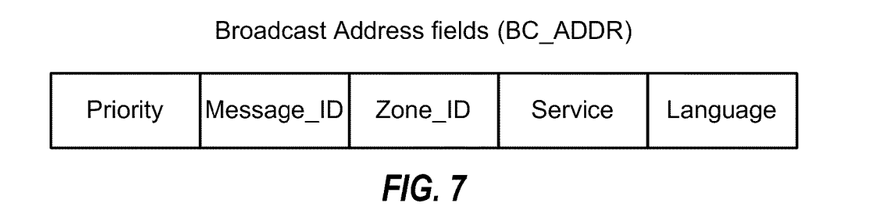
FIG. 7 shows the broadcast address fields (BC_ADDR) for a broadcast SMS message.

FIG. 7 shows the broadcast address fields that are provided with each broadcast SMS message sent on the paging or broadcast channel. The broadcast address fields are collectively referred to as the BC_ADDR field and include five fields: Priority, Message_ID, Zone_ID, Service, and Language. The Service Category, Language, and Priority parameters/subparameters in the Teleservice Layer SMS Deliver Message, if present, should have the same values as those of the BC_ADDR field. The BC_ADDR field is only included in broadcast messages sent on the broadcast and paging channels and not in messages sent on the traffic channel. The BC_ADDR field includes attributes that may be used for broadcast SMS message filtering and is described in detail in Section 3.3.1 of the TIA/EIA-637-B.

Figure 8:
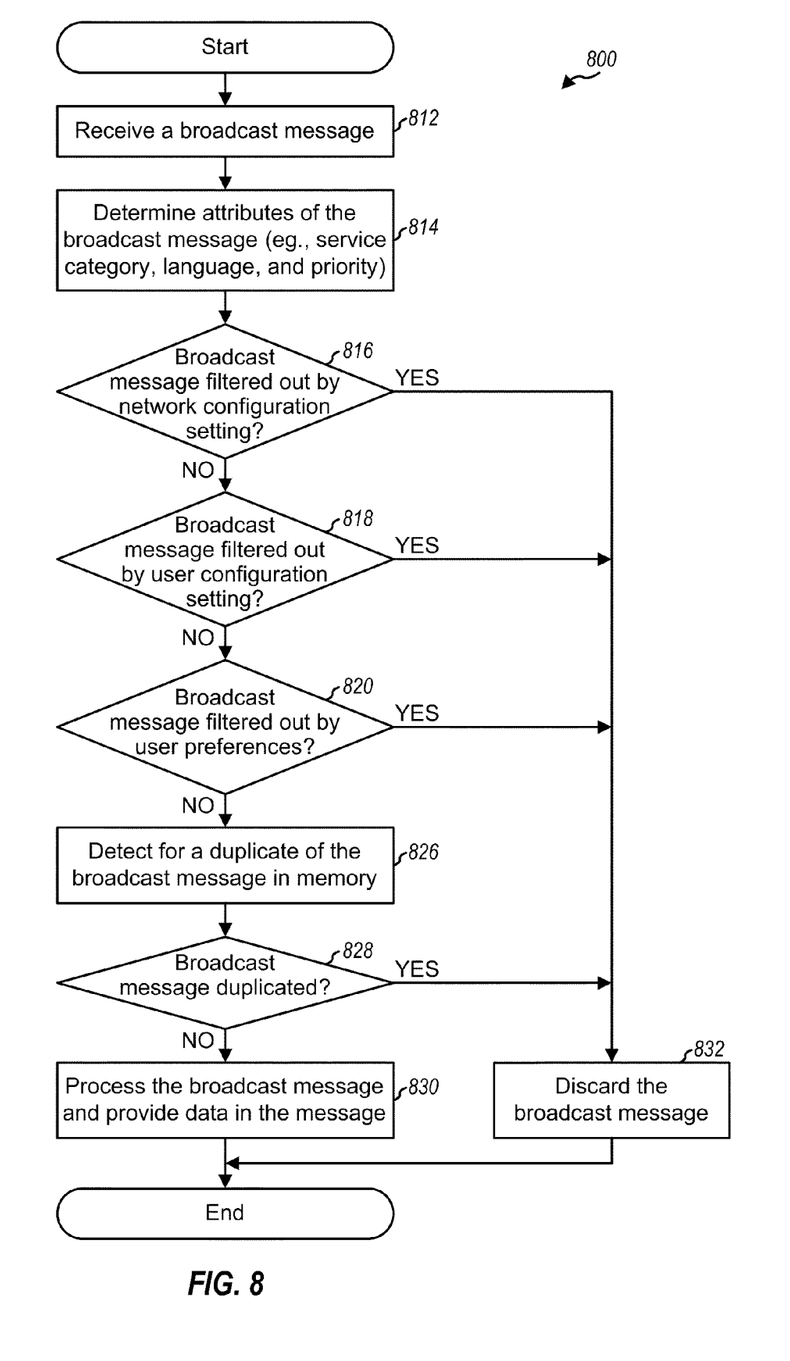
FIGS. 8 and 9 are flow diagrams of two processes for filtering incoming broadcast messages at the mobile station.

FIG. 8 is a flow diagram of an embodiment of a process 800 for filtering incoming broadcast messages at the mobile station. Initially, a new broadcast message is received (step 812). Various attributes of this broadcast message (e.g., service category, language, priority, and so on) which may be used for filtering are then determined from the BC_ADDR field of the broadcast message (step 814).

A determination is then made whether or not the received broadcast message is filtered out by the network configuration setting (step 816). This would be the case if (1) the network configuration setting is "Disallow" or (2) the network configuration setting is "Allow Table Only" and the service category/language of the received broadcast message does not match any of the programmed entries in the service table. (Part (2) may be deferred until a later stage of the process when the service table is consulted.) If the answer for step 816 is yes, then the process proceeds to step 832 where the received broadcast message is discarded.

Otherwise, if the answer for step 816 is no, then a determination is made whether or not the received broadcast message is filtered out by the user configuration setting (step 818). This would be the case if (1) the user configuration setting is "Deactivate" or (2) the user configuration setting is "Activate Table Only" and the service category/language of the received broadcast message does not match any of the programmed entries in the service table. (Again, part (2) may be deferred until a later stage of the process when the service table is consulted.) If the answer for step 818 is yes, then the received broadcast message is discarded in step 832.

Otherwise, if the answer for step 818 is no, then a determination is made whether or not the broadcast message is filtered out by the user preferences (step 820). This would be the case if the service table is to be used and (1) the programmed entry for the service category/language of the broadcast message is not selected, (2) the priority of the broadcast message is lower than the priority level specified in the service table for the service category/language, or (3) the maximum number of broadcast messages have already been stored for the service category/language and the memory is not allowed to be overwritten. The service table is enabled for use if the user configuration setting is "Activate Table Only". If the answer for step 820 is yes, then the received broadcast message is discarded in step 832.

The same broadcast message (i.e., with the same content) may have been sent by multiple base stations, and the mobile station may have already received and stored this broadcast message. A first level of duplicate detection may be implemented to detect if the same message has been received from the same base station multiple times within a time period specified by the TIA/EIA-637-B standard. This can be achieved based on the BC_ADDR field included in the received broadcast message (e.g., by performing a bit-by-bit comparison on the entire BC_ADDR field). A second level of duplicate detection may be implemented at the application level, where the same message received from different base stations are discarded.

Thus, if the answer for step 820 is no, then a check is made to detect for a duplicate of the received broadcast message, which may have already been stored in the memory (step 826). The detection for duplicate may be made based on the BC_ADDR field in the received broadcast message. If a duplicate of the received broadcast message has already been stored in memory, as determined in step 828, then the received broadcast message is discarded in step 832. Otherwise, the received broadcast message is processed and the data in the message is provided to upper layer (step 830). The process then terminates after steps 830 and 832.

Figure 9:
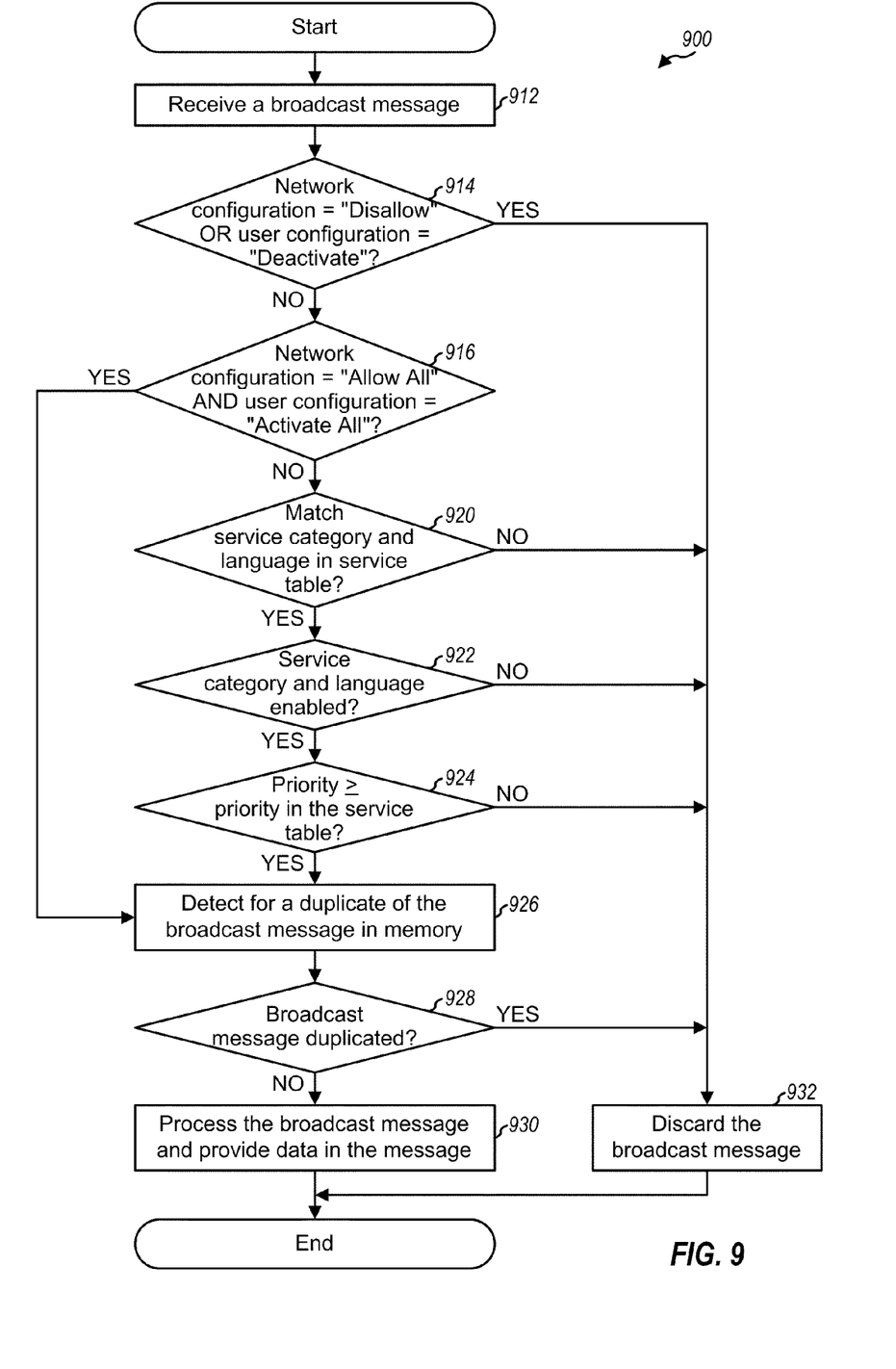

FIG. 9 is a flow diagram of an embodiment of another process 900 for filtering incoming broadcast SMS messages at the mobile station. Initially, a new broadcast message is received and various attributes of this broadcast message are determined (step 912). If the network configuration setting is "Disallow" or if the user configuration setting is "Deactivate" (step 914), then the received broadcast message is discarded in step 932.

Otherwise, if the answer for step 914 is no, then the process would proceed to step 926 if the network configuration setting is "Allow All" and the user configuration setting is "Activate All" (step 916). Otherwise, if the answer for step 916 is no, then the process would proceed to step 926 if the following three criteria are met: (1) the service category and language of the received broadcast message matches a programmed entry in the service table (step 920), (2) the service category/language is selected in the service table (step 922), and (3) the priority of the received broadcast message is not lower than the priority level specified in the service table for the service category/language (step 924). If any of these three criteria is not met, then the received broadcast message is discarded in step 932. Additional criteria may also be applied to the received broadcast message before it can be processed. For example, if the maximum number of broadcast message for this service category has already been stored or if the memory is full, then the message may also be discarded.

In step 926, a duplicate of the received broadcast message is detected, as described above. The received broadcast message would then be either (1) discarded in step 932 if a duplicate is detected or (2) processed in step 930 if a duplicate is not detected. In either case, the process terminates after steps 930 and 932.

The processes shown in FIGS. 8 and 9 may also be used to process a broadcast page. In that case, as part of the processing in steps 830 and 930, the mobile station gets ready to receive the broadcast message for the broadcast page.

The techniques described herein allow broadcast SMS messages to be filtered at the mobile station based on network configuration, user configuration, and user preferences. The broadcast message filtering may advantageously be used for the following example scenarios.

The service provider's ability to control which broadcast messages are allowed to be received by each mobile station is useful for various situations. Depending on its requirements, the service provider may need to disallow broadcast SMS functions of a given mobile station that is otherwise capable of receiving broadcast SMS messages. These requirements may be related to network deployment, service provisioning, subscription status of the mobile station, and so on. For the purpose of service provisioning and subscription management, for a mobile station that is allowed to receive broadcast SMS, the service provider may program the service table in the mobile station to limit the broadcast messages allowed to be received by the mobile station. For example, the service provider may require the mobile station to obtain approval to receive broadcast messages for any new service categories. For a premium subscriber, the mobile station may be programmed such that it is allowed to receive all broadcast services.

The mobile user's ability to control which broadcast messages to receive and process by the mobile station is also useful for various situations. To reduce power consumption and memory usage, the mobile user may (1) temporarily disable the broadcast SMS functions, (2) selectively enable or disable any programmed entry in the service table, (3) limit the priority of the received services, and so on. For example, a mobile user may be interested in weather forecasts but not stock quotes (e.g., during non-working hours). This same user may thereafter change the service selections to enable stock quote and disable weather forecasts (e.g., during working hours). As another example, a mobile user may be interested in emergency or urgent weather forecasts at one moment and may be interested in all types of weather forecasts at another moment.

The settings for the network and user configurations may also be used to control the reception of broadcast SMS messages at the mobile station. For example, if the mobile station is not allowed to receive broadcast SMS (i.e., network configuration is set to "Disallow") or if the mobile user temporarily disables broadcast SMS (i.e., user configuration is set to "Deactivate"), then the mobile station may be controlled so that it does not wake up at broadcast slots to receive broadcast pages or broadcast messages, and does not look at the broadcast messages that are sent in the regular paging slots. It should be noted that the mobile station can still receive broadcast pages and messages in its regular paging slots, but these pages and messages may also be ignored or discarded if needed. Otherwise, operating with broadcast SMS turned on can reduce power consumption and increase standby time, both of which are highly desirable.

The filtering techniques described above may be used for broadcast messages received on paging and broadcast channels. These techniques may also be used to filter broadcast messages received on forward traffic channels. For TIA/EIA-637-B, if a broadcast message is received over a traffic channel, there is no BC_ADDR field in the message. In this case, the first level of duplicate detection does not apply, and the filtering may be performed based on the message parameters and/or subparameters.

The techniques described herein for filtering broadcast messages at the mobile station may be implemented by various means. For example, these techniques may be implemented in hardware, software, or a combination thereof. For a hardware implementation, the elements used to implement any one or a combination of the techniques described herein (e.g., the processes shown in FIGS. 8 and 9) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques for filtering broadcast messages at the mobile station may be implemented with modules (e.g., procedures, functions, and so on) that perform the functions described herein. The software codes may be stored in a memory unit (e.g., memory units 262 in FIG. 2) and executed by a processor (e.g., controller 260). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of filtering broadcast messages at a mobile station in a wireless communication network, comprising:

receiving a short messaging service message originating from a service provider indicative of network configuration settings specifying filtering of reception of broadcast messages to be programmed at the mobile station;

sending a message to the service provider indicating whether the network configuration settings have been successfully programmed at the mobile station;

receiving a broadcast message after the network configuration settings previously transmitted by the service provider have been programmed at the mobile station and if a broadcast service is enabled based on the network configuration settings and a user preference setting;

applying filtering criteria to the received broadcast message, wherein the filtering criteria are defined by the network configuration settings and the user preference setting for controlling the broadcast service on the mobile station; and allowing reception of the broadcast messages while consulting the filtering criteria imposed by the service provider.

2. The method of claim 1, wherein the filtering criteria include user-determined filtering criteria.

3. The method of claim 2, wherein the user-determined filtering criteria are defined by a user configuration setting that indicates all broadcast messages are to be received, no broadcast messages are to be received, or only broadcast messages for entries programmed in a service table are to be received.

4. The method of claim 1, wherein the filtering criteria include user-selected filtering criteria for user preferences.

5. The method of claim 4, wherein the user-selected filtering criteria allow for filtering of broadcast messages based on service category, language, priority, or any combination thereof.

6. The method of claim 4, wherein the user-selected filtering criteria apply to entries programmed in a service table.

7. The method of claim 6, wherein each entry in the service table corresponds to a unique combination of service category and language.

8. The method of claim 1, further comprising:
detecting for a duplicate of the received broadcast message, and wherein the received broadcast message is only processed if a duplicate is not detected.

9. The method of claim 1, further comprising:
consulting the network configuration settings and a user preference setting to enable or disable reception of the broadcast message.

10. A method of filtering broadcast messages at a mobile station in a communication network, comprising:
receiving a short messaging service message originating from a service provider indicative of network configuration settings specifying filtering of reception of broadcast messages to be programmed at the mobile station;
sending a message to the service provider indicating whether the network configuration settings have been successfully programmed at the mobile station;
receiving a broadcast message after the network configuration settings previously transmitted by the service provider have been programmed at the mobile station and if a broadcast service is enabled based on the network configuration settings and a user preference setting;
applying filtering criteria imposed by the service provider to the received broadcast message, the filtering criteria defined by network configuration settings and the user preference setting for controlling the broadcast service on the mobile station; and
allowing reception of the broadcast messages while consulting the filtering criteria imposed by the service provider.

11. The method of claim 10, wherein the filtering criteria further include user-determined filtering criteria defined by a user configuration setting and user-selected filtering criteria defined for entries programmed in a service table.

12. The method of claim 11, further comprising:
consulting the network configuration settings and the user preference setting to determine whether the mobile station is enabled to receive broadcast messages.

13. An apparatus in a wireless communication network and operable to filter incoming broadcast messages, comprising:
means for receiving a short messaging service message originating from a service provider indicative of network configuration settings specifying filtering of reception of broadcast messages to be programmed at a mobile station; means for sending a message to the service provider indicating whether the network configuration settings have been successfully programmed at the mobile station;
means for receiving a broadcast message after the network configuration settings previously transmitted by the service provider have been programmed at the mobile station and if a broadcast service is enabled based on the network configuration settings and a user preference setting;
means for applying filtering criteria to the received broadcast message, wherein the filtering criteria are defined by the network configuration settings and the user preference setting for controlling the broadcast service on the mobile station;
a removable module for storing the network configuration settings indicative of the filtering criteria; and
means for allowing reception of the broadcast messages while consulting the filtering criteria imposed by the service provider.

14. The apparatus of claim 13, wherein the filtering criteria include user-determined filtering criteria defined by a user configuration setting.

15. The apparatus of claim 14, wherein the filtering criteria include user-selected filtering criteria that allow for filtering of broadcast messages based on service category, language, priority, or any combination thereof.

16. The apparatus of claim 13, wherein the removable module stores the network configuration settings in one or more elementary files.

17. A non-transitory computer-readable medium including computer-executable instructions encoded thereon for performing a method of filtering broadcast messages at a mobile station in a communication network, the method comprising the steps of:
receiving a short messaging service message originating from a service provider indicative of network configuration settings specifying filtering of reception of broadcast messages to be programmed at the mobile station;
sending a message to the service provider indicating whether the network configuration settings have been successfully programmed at the mobile station;
receiving a broadcast message after the network configuration settings previously transmitted by the service provider have been programmed at the mobile station and if a broadcast service is enabled based on the network configuration settings and a user preference setting;
applying filtering criteria to the received broadcast message, wherein the filtering criteria are defined by the network configuration settings and the user preference setting for controlling the broadcast service on the mobile station; and
allowing reception of the broadcast messages while consulting the filtering criteria imposed by the service provider.

18. A non-transitory computer-readable medium including computer-executable instructions encoded thereon for performing a method of filtering broadcast messages at a mobile station in a communication network, the method comprising the steps of:
receiving a short messaging service message originating from a service provider indicative of network configuration settings specifying filtering of reception of broadcast messages to be programmed at the mobile station;

sending a message to the service provider indicating whether the network configuration settings have been successfully programmed at the mobile station;
receiving a broadcast message after the network configuration settings previously transmitted by the service provider have been programmed at the mobile station and if a broadcast service is enabled based on the network configuration settings and a user preference setting;
applying filtering criteria imposed by the service provider to the received broadcast message, the filtering criteria defined by network configuration settings and the user preference setting for controlling the broadcast service on the mobile station; and
allowing reception of the broadcast messages while consulting the filtering criteria imposed by the service provider.

* * * * *